United States Patent [19]

Andruzzi, Jr. et al.

[11] Patent Number: 4,580,276
[45] Date of Patent: Apr. 1, 1986

[54] SYSTEM AND METHOD FOR TRANSPORTING DATA

[75] Inventors: Anthony M. Andruzzi, Jr., Acworth; Stanley B. Warner, Gainesville, both of Ga.

[73] Assignee: Consultant's Choice Inc., Atlanta, Ga.

[21] Appl. No.: 520,683

[22] Filed: Aug. 5, 1983

[51] Int. Cl.⁴ .............................................. H03C 5/00
[52] U.S. Cl. ........................................ 375/42; 375/45; 375/9; 340/310 R; 455/615; 370/24
[58] Field of Search .................. 375/9, 42, 45, 51, 37, 375/41, 44, 47, 48, 49, 58; 370/11, 24, 31, 41; 340/310 A, 310 R, 825.7, 825.73, 825.5, 825.57; 371/8; 455/61, 608, 615; 332/9 R, 17, 10

[56] References Cited

U.S. PATENT DOCUMENTS

| | | | |
|---|---|---|---|
| 2,676,203 | 4/1954 | Phelps | 375/51 |
| 3,320,364 | 5/1967 | Steiner et al. | 375/49 |
| 3,486,117 | 12/1969 | Groves et al. | 375/42 |
| 3,588,348 | 6/1971 | Bowling | 375/62 |
| 3,820,070 | 6/1974 | Fox | 340/825.73 |
| 3,967,264 | 6/1976 | Whyte et al. | 340/310 |
| 4,001,693 | 1/1977 | Stackhouse et al. | 375/114 |
| 4,040,046 | 8/1977 | Long et al. | 340/310 |
| 4,041,398 | 8/1977 | Ellis | 455/5 |
| 4,057,793 | 11/1977 | Johnson et al. | 340/310 R |
| 4,086,430 | 4/1978 | Brown | 375/80 |
| 4,093,946 | 6/1978 | Fowler | 340/310 |
| 4,101,834 | 7/1978 | Stutt et al. | 370/64 |
| 4,130,874 | 12/1978 | Pai | 364/514 |
| 4,152,605 | 5/1979 | Conde et al. | 307/3 |
| 4,170,764 | 10/1979 | Salz et al. | 332/17 |
| 4,200,862 | 4/1980 | Campbell et al. | 340/310 |
| 4,217,467 | 8/1980 | Kobayashi et al. | 178/67.1 |
| 4,222,035 | 9/1980 | Lohoff | 340/825.57 |
| 4,292,623 | 9/1981 | Eswaran et al. | 340/825.5 |
| 4,320,522 | 3/1982 | Hayes | 340/825.71 |
| 4,345,250 | 8/1982 | Jacobsthal | 340/825.5 |
| 4,348,657 | 9/1982 | Merkel | 340/310 R |
| 4,355,303 | 10/1982 | Phillips et al. | 340/310 A |
| 4,410,983 | 10/1983 | Cope | 371/8 |
| 4,425,665 | 1/1984 | Stauffer | 375/9 |
| 4,464,766 | 8/1984 | Masur | 375/49 |

OTHER PUBLICATIONS

Ciarcia's Circuit Cellar, "Computerize a Home," *BYTE Publications, Inc.*, Jan. 1980.
RAM-11, "Asynchronous Random Access Modem," *Data-Control Systems* (undated).
LCM-1100, Communications Research Corporation, *BYTE Publications, Inc.*, Sep. 1982.

*Primary Examiner*—Benedict V. Safourek
*Attorney, Agent, or Firm*—Bacon & Thomas

[57] ABSTRACT

A private local area network (LAN) is created for use with a variety of transmission media for the purpose of exchanging data preassigned addresses, and control signals according to simplified protocols. The LAN members can consist of any combination of computers, electronic devices or terminals adapted for intercommunication via microprocessor-based modems which are capable of performing either master or slave functions within the LAN in accordance with their individual software designations. Each modem operating on the LAN has the capability of filtering analog noise, detecting/blocking digital data errors, operating within a wide range of appropriate line impedances, and both transmitting and receiving digital data at rates in the neighborhood of 85 kbaud in the form of frequency, or tone, bursts according to a hybrid ASK/FSK data encoding an transmission scheme. That encoding/transmission scheme consists of the selection of one frequency, or tone, to be both transmitted and received for a duration equivalent to no more than one-half the bit period of a "1" and of the selection of a second frequency to be both transmitted and received for a duration equivalent to no more than one-half the bit period of a "0".

16 Claims, 10 Drawing Figures

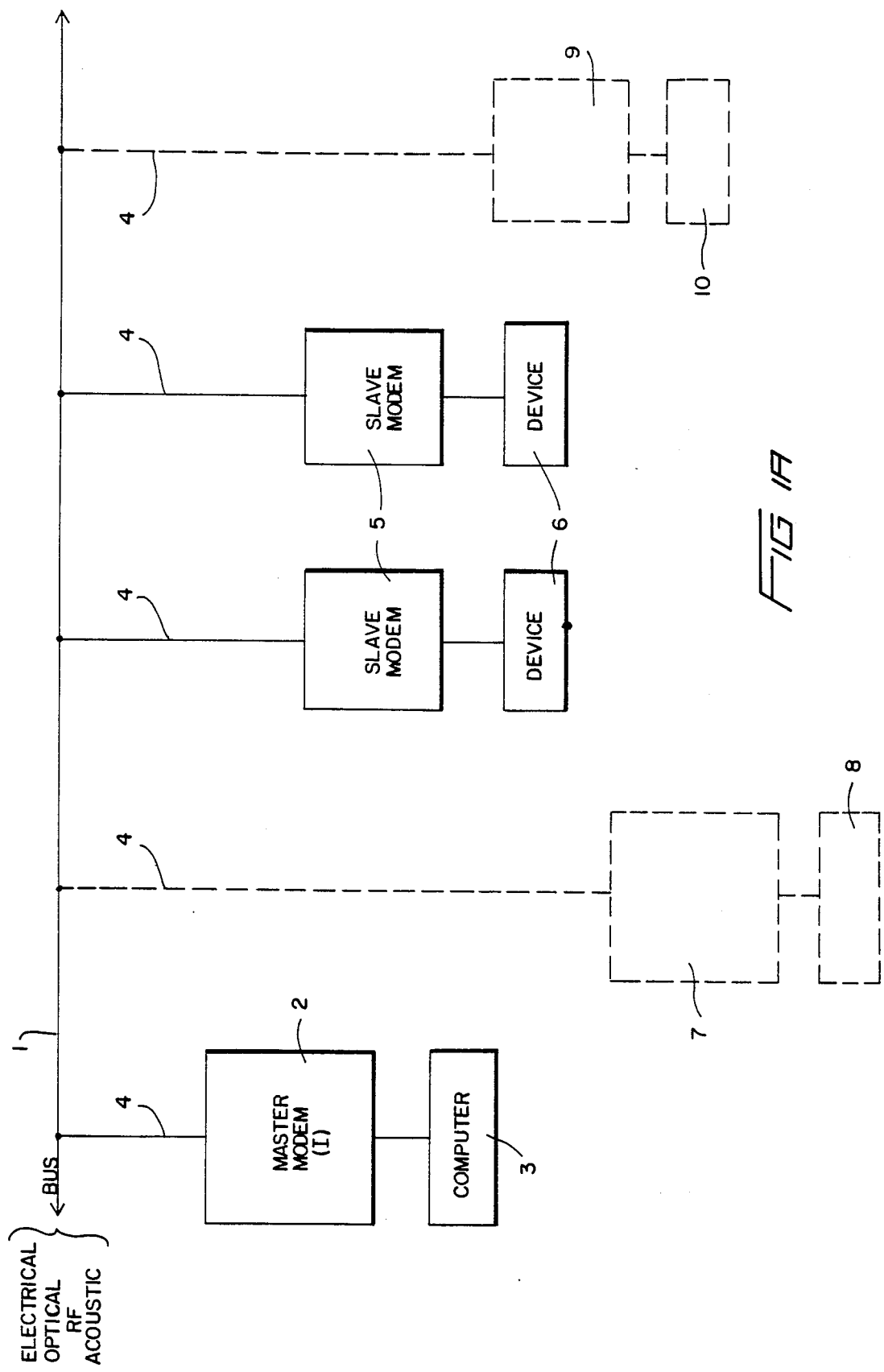

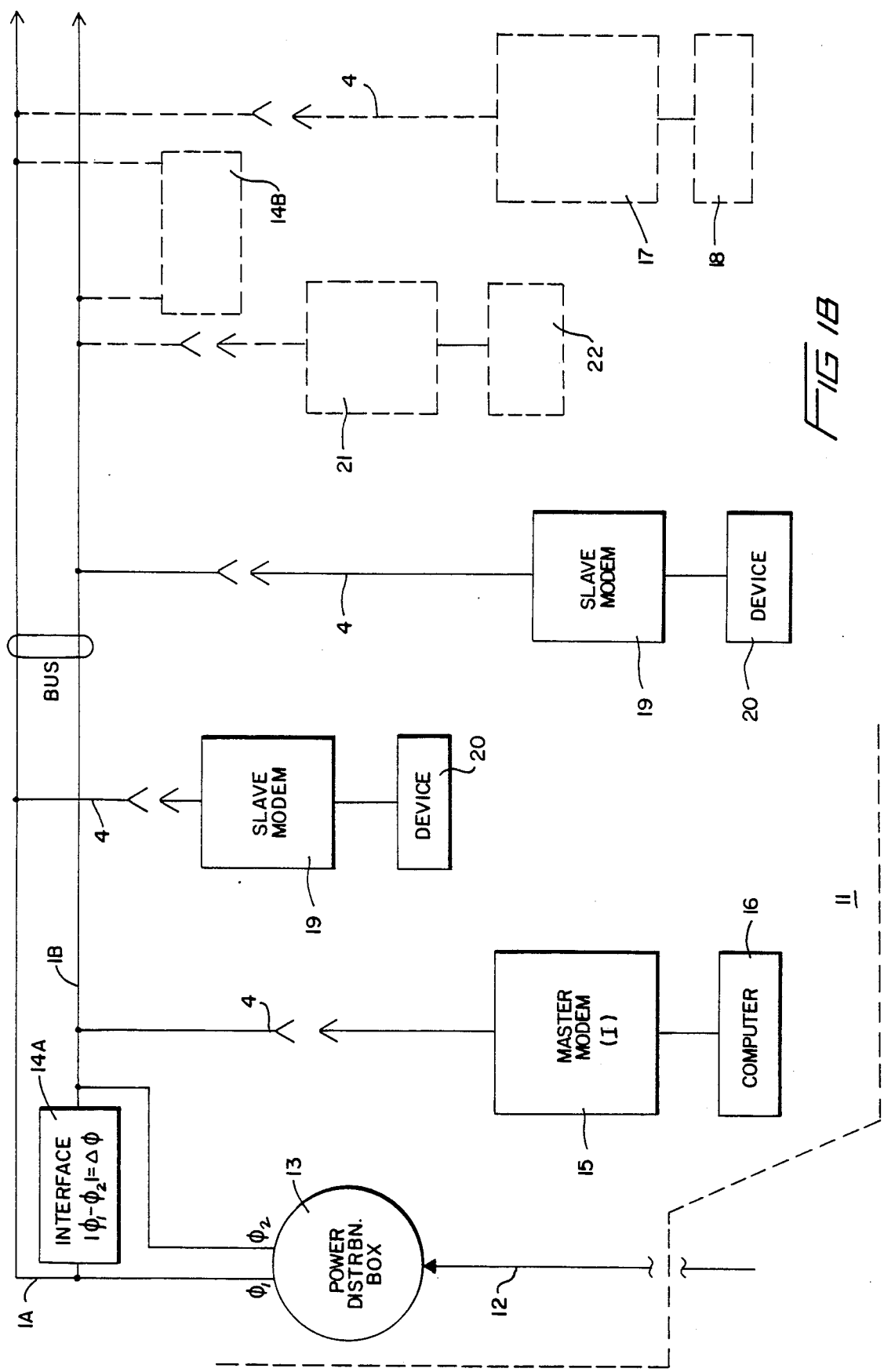

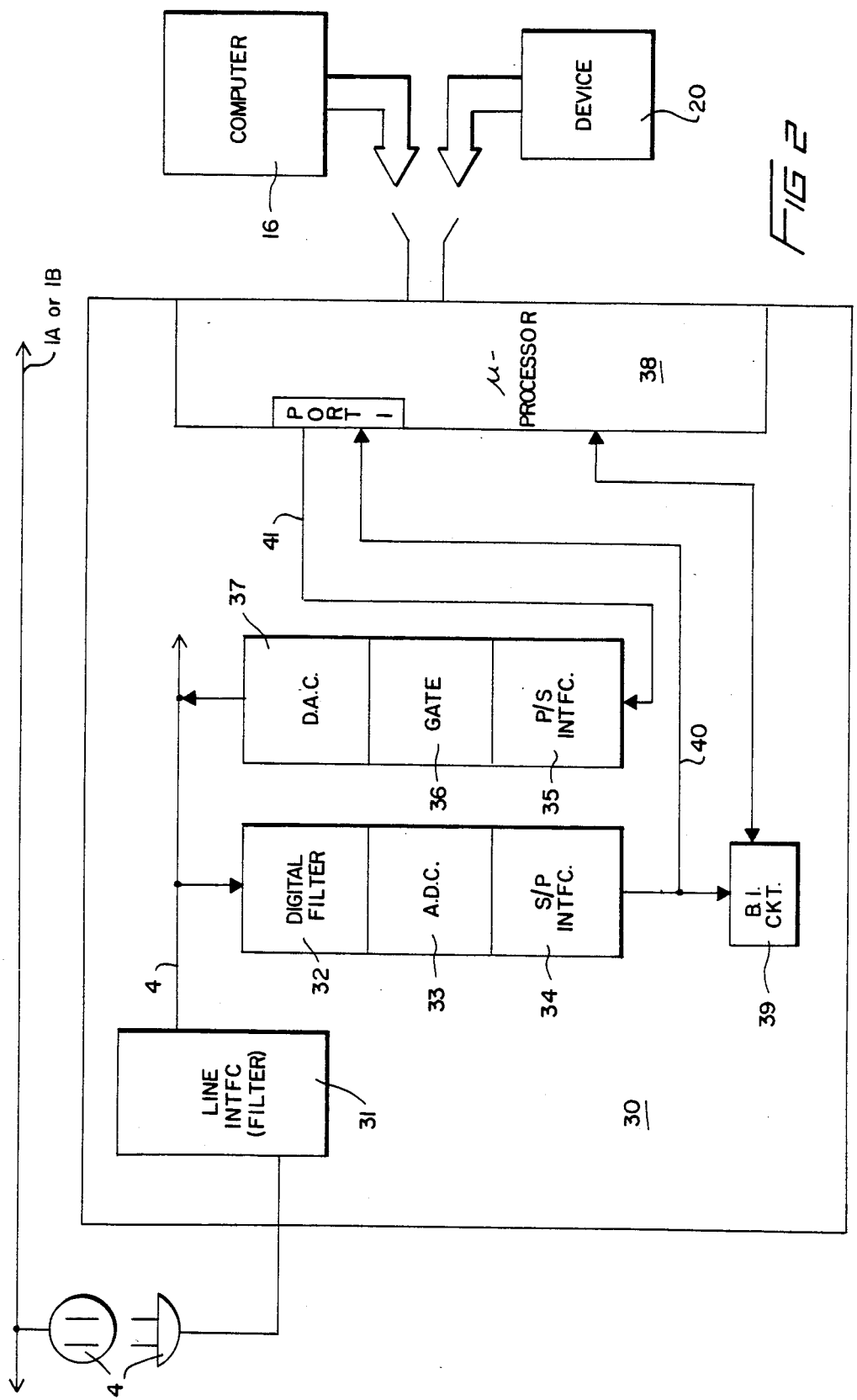

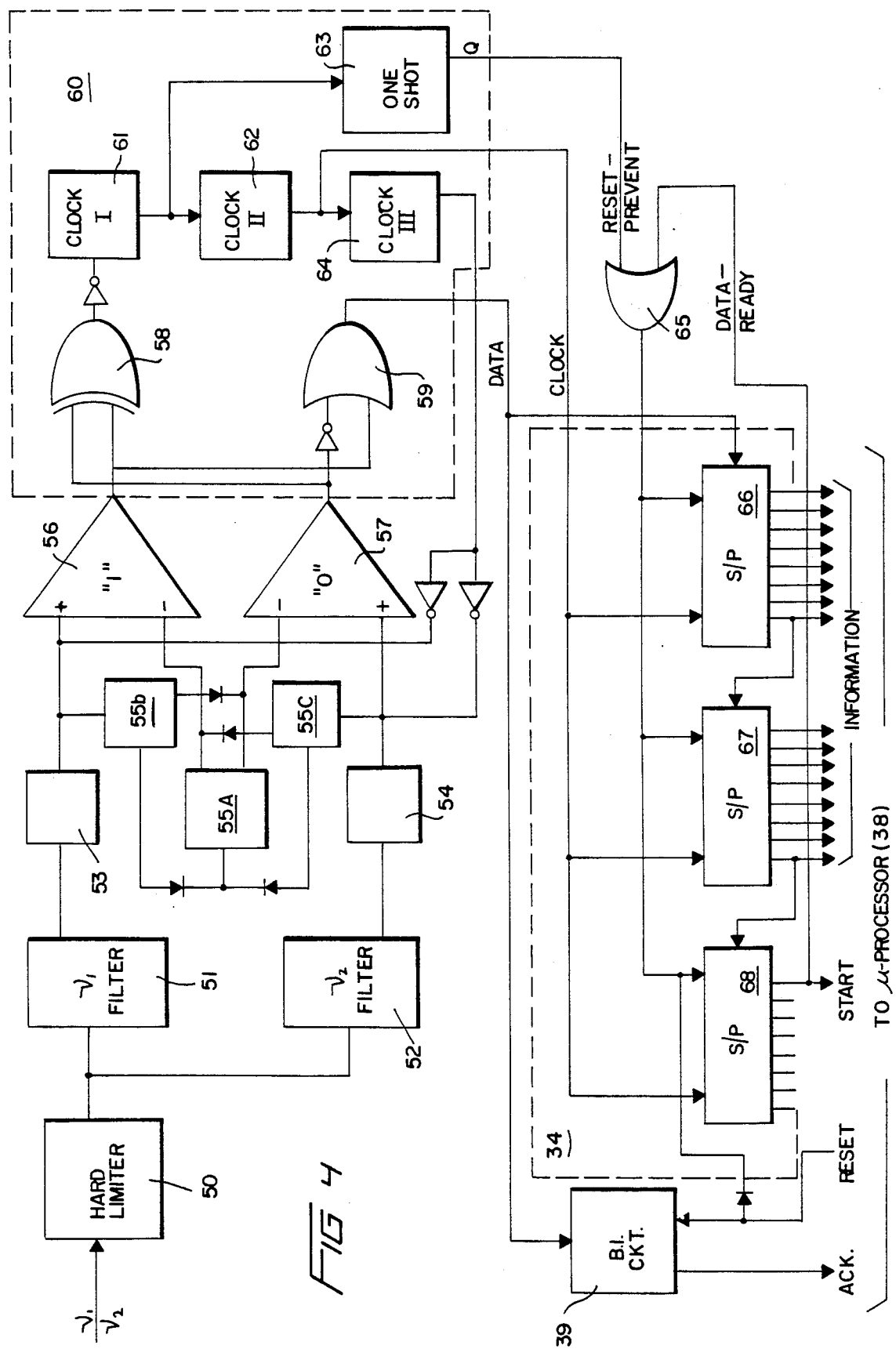

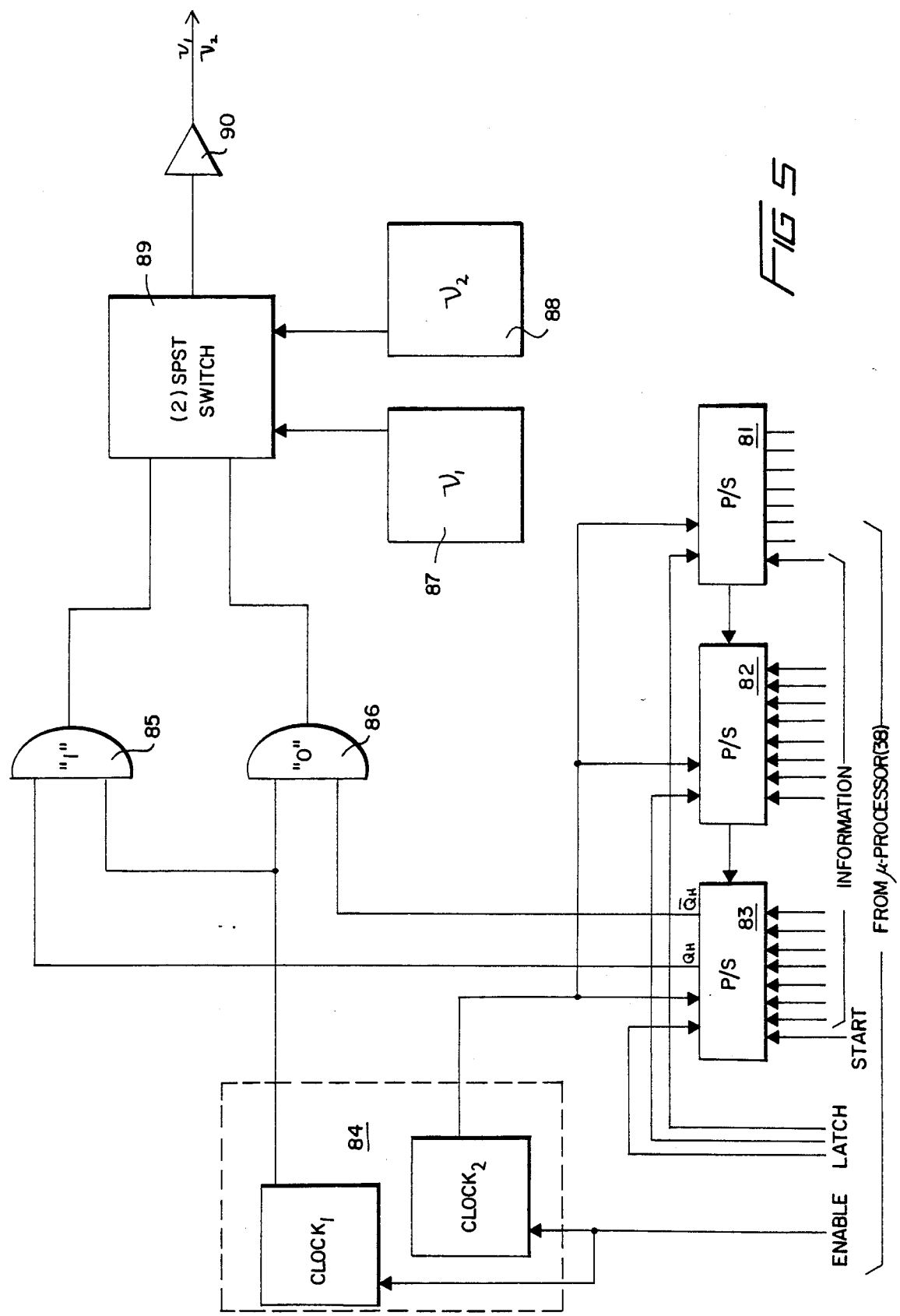

FIG 6

| MESSAGE WORD LEGEND | | |
|---|---|---|
| INFORMATION<br>DATA OR ADDRESS | CONTROL<br>FIELD | START |
| 8 BITS | 3 BITS | 1 BIT |

| PROTOCAL<br>DESIGNATION | SIGNAL CONTENT | CONTROL FIELD | MEANING AND SIGNIFICANCE |
|---|---|---|---|
| 1 | SET UP | 111 | ACKNOWLEDGE WORD RECEIPT |
| 2 | | 110 | INFORMATION=ADDRESS; DATA FOLLOWS |
| 3 | | 100 | INFORMATION=ADDRESS; SEND DATA NOW |
| 4 | DATA | 000 | DATA ITSELF |
| 5 | | 001 | NO DATA AVAILABLE |
| 6 | | 011 | BUSY |
| 7 | | 101 | INFORMATION=ADDRESS; GO OFF-LINE |
| 8 | | 010 | INFORMATION=ADDRESS; RETURN ON-LINE |
| 9 | TRAFFIC<br>MANAGEMENT | 1000 | (ROVING-MASTER OPTION)<br>WHO IS CURRENT MASTER? |
| 10 | | 1001 | (ROVING-MASTER OPTION)<br>MASTER FUNCTION REQUEST |
| 11 | | 1010 | (ROVING-MASTER OPTION)<br>MASTER FUNCTION PASSED |
| 12 | | 1011 | (ROVING-MASTER OPTION)<br>MASTER FUNCTION NOT PASSED |

AS USED IN FIGS. 8A & 8B (rows 1–8)

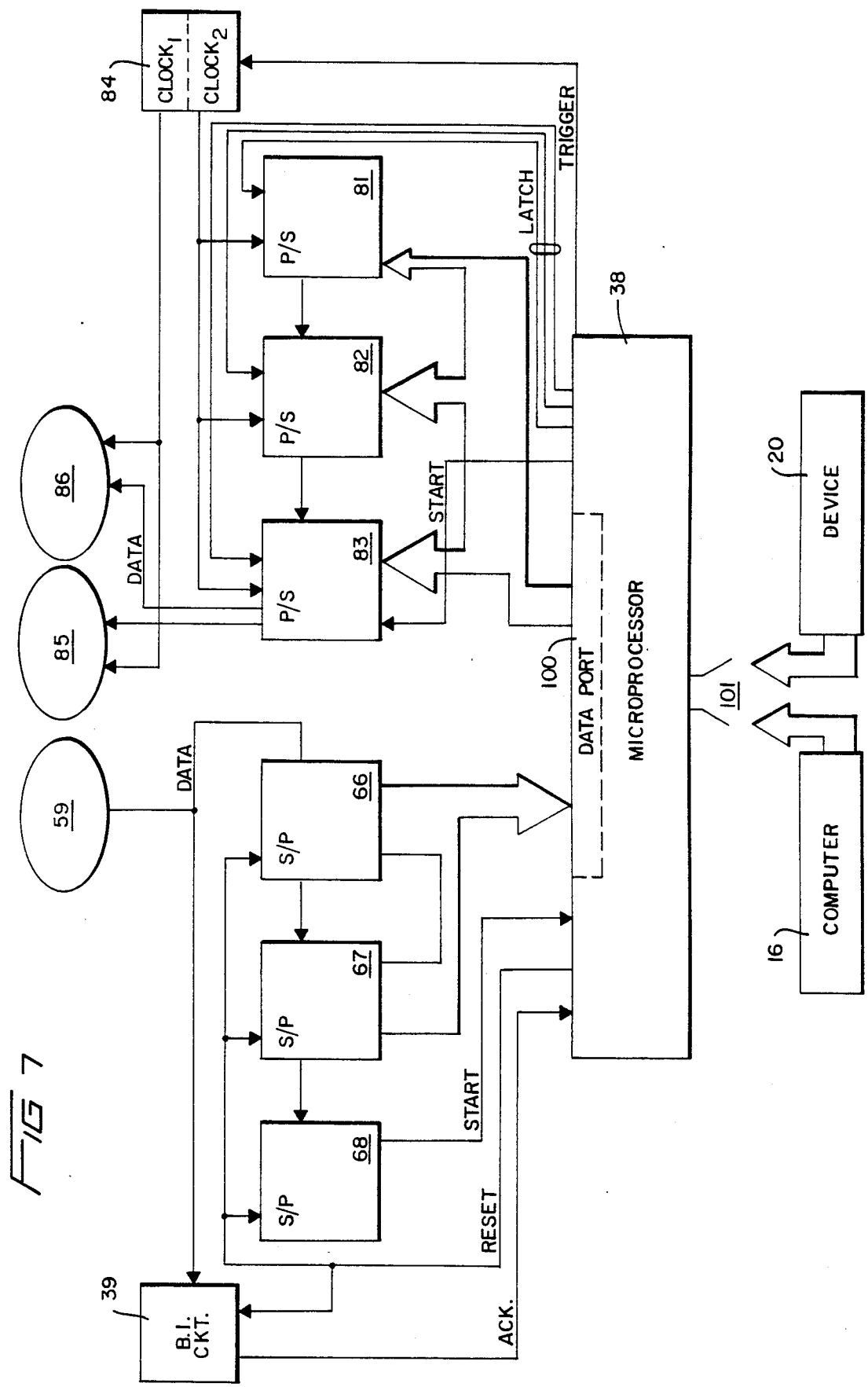

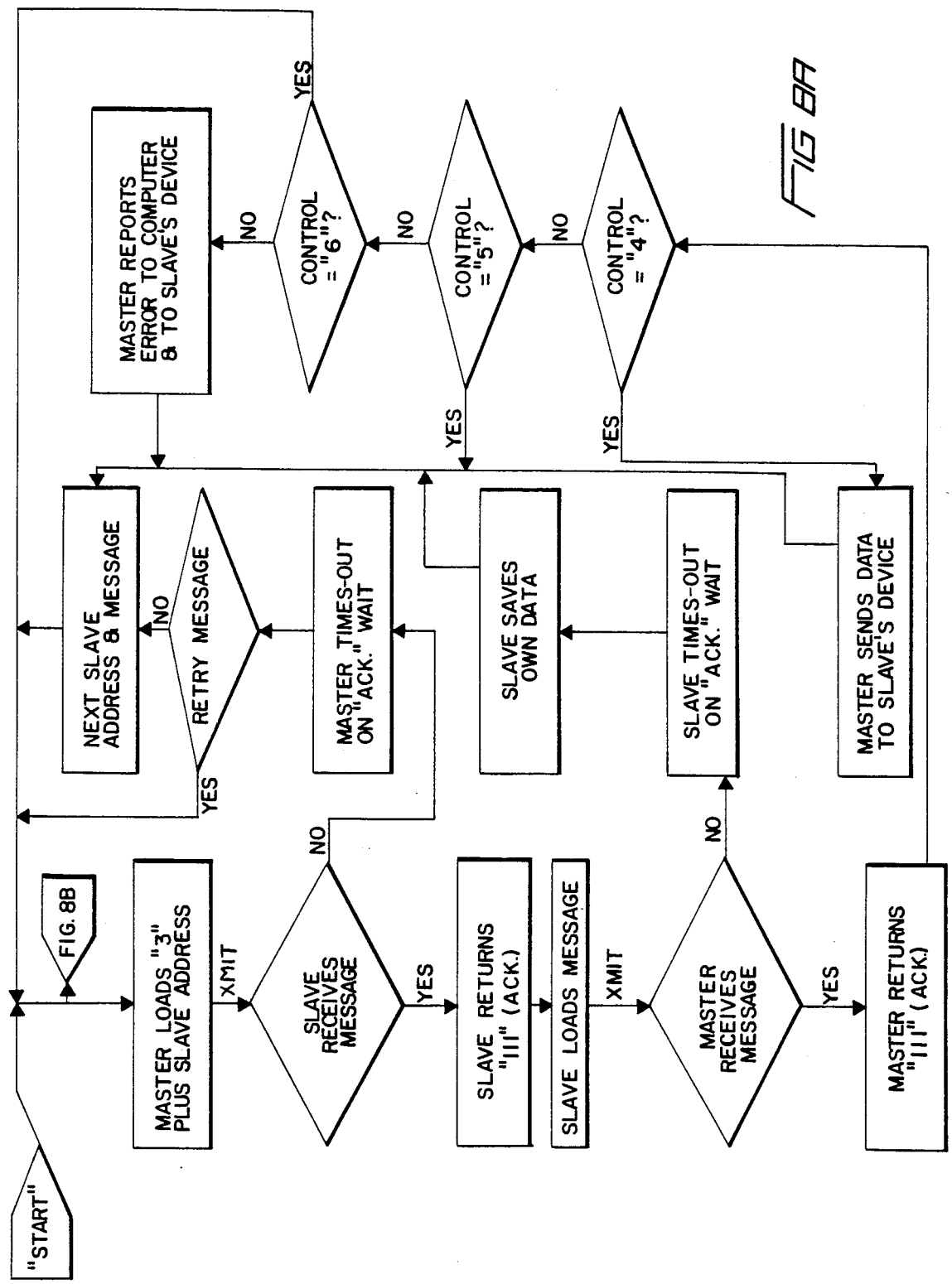

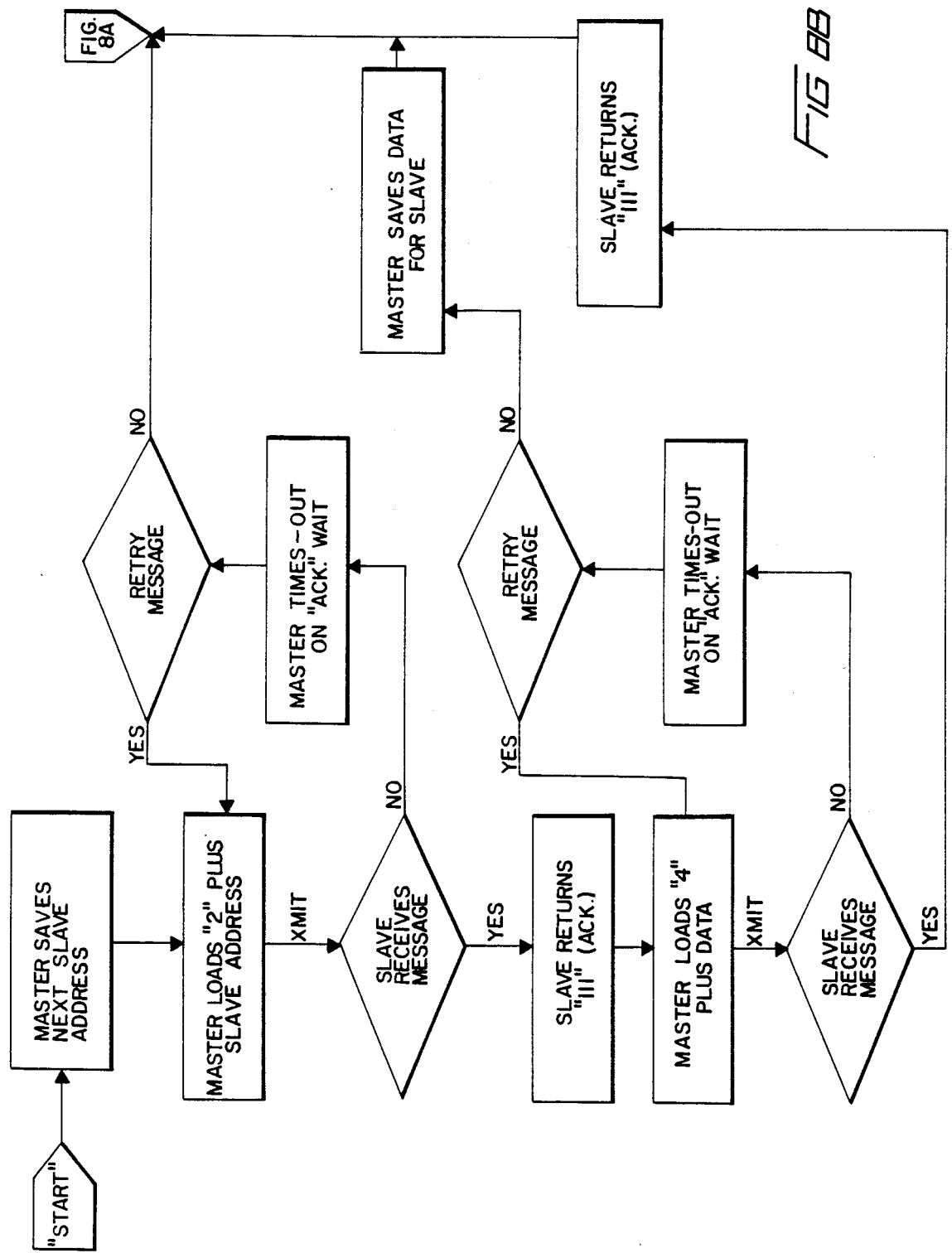

SYSTEM AND METHOD FOR TRANSPORTING DATA

BACKGROUND OF THE INVENTION

This is an invention devoted to data communications with applications to simple or complex multi-branched networks—usually of a private nature. Regardless of the transmission medium employed, two common problems are transmission noise and digital error. Accordingly, much time, expense, and engineering have gone into the solutions to these drawbacks.

One method of providing for increased reliability given a "quiet" transmission medium, has involved carrier ASK; at best this method has only produced results on the order of $3 \times 10^{-2}$ errors per message.

Another method frequently used for achieving high speed reliable transmissions has been PLL constant carrier scheme whereby logical 1's and 0's are generated via PSK, FSK or FM techniques; however, the best coherent endeavors of this type typically yield results of around $9 \times 10^{-4}$ errors per second on the most favorable kinds of transmission media.

It is therefore the object of this invention to devise a better, more error-free data encoding and transmission scheme for private data networks utilizing a variety of transmission media—particularly, noisy media. Low error rates are expected surpassing those above-quoted, and accordingly a variety of private data networks are herein disclosed, including modems which are capable of communicating or transporting data using a hybrid ASK/FSK scheme.

SUMMARY OF THE INVENTION

Disclosed herein is a particular method for encoding and both transmitting and receiving data which has aspects of amplitude-shift keying (ASK) and frequency-shift keying (FSK)—hence, a hybrid ASK/FSK data encoding and transmission scheme. Further disclosed is a particular modem designed to exploit this hybrid ASK/FSK (or hereinafter, simply "ASK/FSK") scheme for the purpose of transmitting and receiving data originating in the computer, electronic device or terminal to which that modem is connected. It is reasonably anticipated that an entire network of these modems could be constructed over various transmission media, and accordingly, a number of embodiments of such private data networks are herein disclosed as well—all utilizing the modems and the ASK/FSK scheme herein disclosed. Therefore, this invention consists of an integration of a method, means, and environment for exchanging data.

At the foundation of this disclosure is the ASK/FSK data encoding and transmission scheme which encodes for a logical one, or mark, by the use of one unique frequency, or tone, and similarly a logical zero, or space, is designated by the use of a second unique frequency, or tone, in both the transmitting and receiving of data; this is the FSK-aspect of the transmission scheme. However, a further condition is imposed upon this skeleton-FSK method in order to achieve an even higher degree of unequivocal data encoding and transmission vis-a-vis the designation and recognition of "1's" and "0's." That further requirement consists essentially of receiving the unique logical-one frequency for a set, predetermined period of time which at most is assigned the equivalence of one-half the total digital bit period of the "1." This "on-off" feature of the transmitted/received frequency, or tone, is the essence of the ASK-aspect of this encoding and transmission scheme. In like manner, the second, distinct logical-zero frequency, or tone, is held "on" for a period of time less than or equal to one-half the total digital bit period of the "0." Thus, the two-fold prescription for encoding and transmitting/receiving data in this manner permits a high degree of reliability in data handling, particularly in counteracting false bits, transmission media transients, and other sources of digital error and noise.

Implementation of this ASK/FSK scheme is readily accomplished by the modem of this invention insofar as it is in direct contact with other modems of like kind in a local area network (LAN). Such a private data network, or LAN, need not be medium-specific in order to practice data handling with the ASK/FSK scheme aforementioned; it could operate over a fiber optical link, acoustic channel, RF channel, line-of-sight laser link or even electrical conductors. Hence, the generic embodiment of this full invention includes only a generalized transmission medium to which are interconnected a collection of modems which exchange data according to the hybrid ASK/FSK scheme herein disclosed, and which further may (and should) have computers and/or electronic devices and terminals separately and individually connected thereto which are able to communicate with simplified protocols due to the inherent low error and low noise characteristics of the hybrid ASK/FSK scheme. A hierarchy could be established, for example, among all these devices whereby a computer could serve as the "network master" with the remaining devices or terminals functioning as "network slaves." One would not be venturing outside the spirit of this invention further to incorporate the use of a plurality of network-master computers which could pass the master function among themselves according to a preprogrammed plan. An LAN of any type discussed to this point could utilize a discrete pair of frequencies for its logical one's and zero's in accordance with the dispersion characteristics of the transmission medium selected and the bits-per-second (baud) data transmission rate desired.

One preferred embodiment of this invention is transmission-medium-specific in favor of a set of electrical conductors which may be wire pairs or coaxial cables. Such an LAN could be designated "ELECTRICAL SYSTEM TRANSPORTER" (EST), and it could function along the lines of a common power-line carrier system (PLC). The EST-embodiment of this invention is herein disclosed to operate within the localized transmission medium defined by the electrical distribution system (metallic conductors) of a building, house or any localized residential/commercial complex. Accordingly, data is exchanged in bidirectional fashion (half-duplex) among at least one network master modem, to which is connected a computer, and a plurality of slave modems which are appropriately connected to separate electronic devices, alarms, printers, thermostats, appliances, monitors or communication terminals. A phase-interface circuit is utilized to minimize phase distortion problems which could occur in the LAN by virtue of the PLC-type multiple electrical branches (conductors) in a single building or plurality of buildings.

A modem constructed within the guidelines associated with the EST would have the following minimal features or characteristics: the capability of both transmitting and receiving a pair of distinct tones in the frequency range of c. 170 kHz, a commercial power (i.e., 60 Hz, etc.) drainage filter, an on-board microprocessor controller, an analog-to-digital-converter-type (ADC) receiving circuit, a digital-to-analog-converter-type (DAC) transmitting circuit a special XOR-gating digital error-detecting-and-blocking subcircuit, appropriate digital interfaces for linking the microcontroller to the transmitter and receiver sections, and asynchronous clocking means. Low-cost design could be maintained while still permitting data transmission rate of c. 85 kbaud to be utilized. The error rates and noise rejection characteristics of a modem employing the hybrid ASK/FSK data encoding and transmission scheme are so conducive to high reliability in data handling that a satisfactory EST, including one master and up to 256 slave modems, is disclosed utilizing only 3-bit protocols and 8-bit modem addresses.

LISTING OF THE DRAWINGS & CHARTS

FIG. 1A illustrates the generic embodiment of the invention consisting of a LAN with at least one master controller and with a generalized medium serving as the communication bus.

FIG. 1B illustrates a second embodiment of the invention consisting of an electrically wired LAN functioning as a PLC system with a fixed master controller.

FIG. 2 represents a typical modem (master or slave) used in the PLC-type LAN of FIG. 1B.

Figure 3:
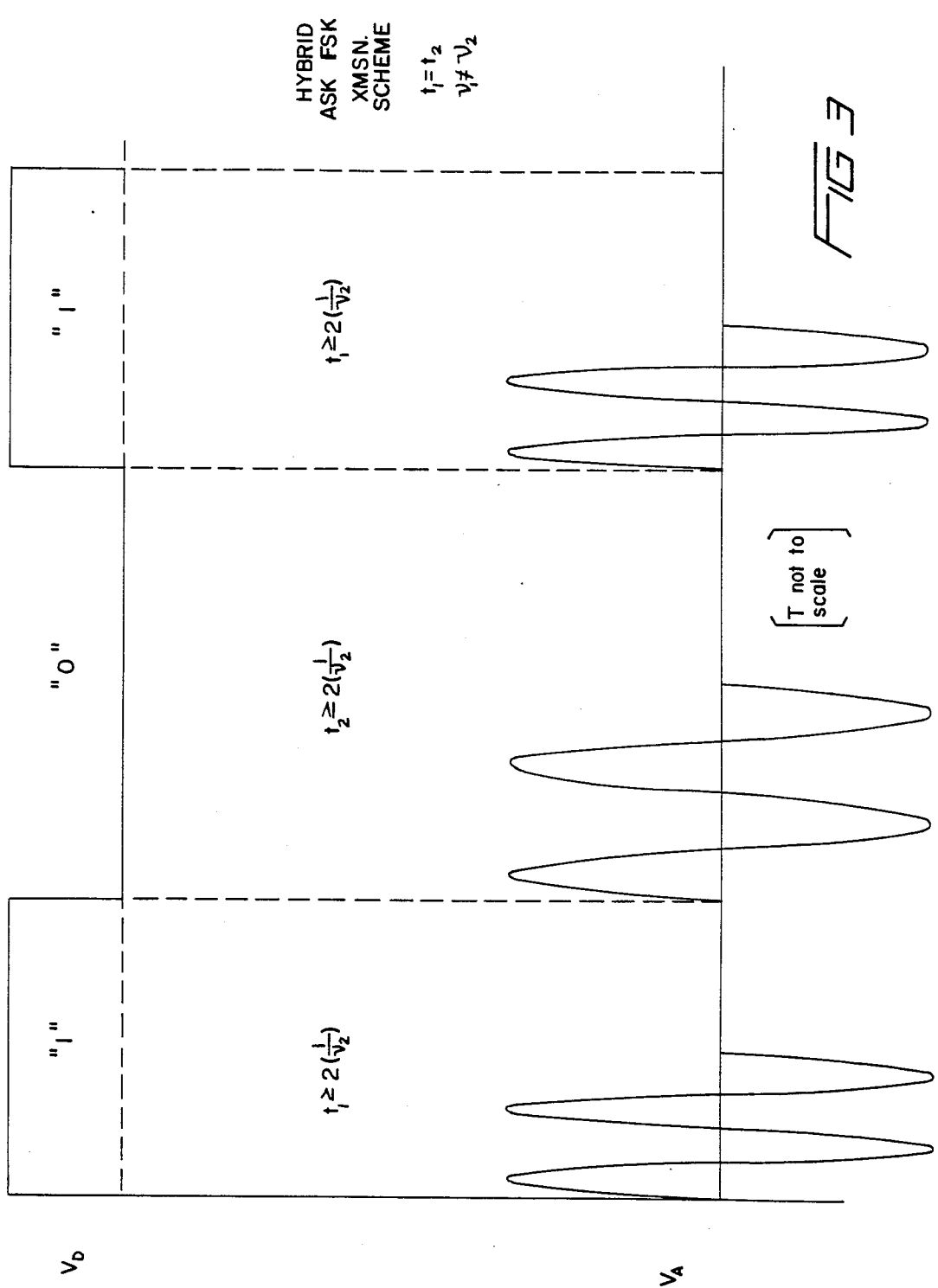
FIG. 3 represents the two-frequency digital transmission and data-encoding scheme intended to be used integrally with this invention for achieving low error rates and high S/N.

FIG. 4 delineates the essential details of the ADC receiver and S/P interface section of the modem illustrated in FIG. 2.

FIG. 5 shows the essential details of the DAC transmitter and P/S interface sections of the modem illustrated in FIG. 2.

FIG. 6 is an example of a single 12-bit message format which could be utilized in the data transmission scheme of this invention; also detailed is a legend of the low-level protocols which could be used in the control field of that message. Some higher-level protocols are also exhibited.

FIG. 7 depicts the interface between the on-board microprocessor controller and the digital shift registers of the transmit/receive circuits of the modem illustrated in FIG. 2.

FIGS. 8A and 8B represent a minimal low-level protocol operational algorithm and event chart for two-way communication between the master and slave modems of FIGS. 1A and 1B.

DETAILED DESCRIPTION OF THE PREFERRED EMBODIMENTS

FIG. 1A refers to a design of a local area network (LAN) for two-way data intercommunication employing all the fundamental concepts of this invention in the broadest, most generic fashion. This fact should become immediately apparent to the reader by the absence of identity imputed to the communication bus 1, which accordingly may be electrical conductors (as in the second embodiment of this invention), optical fiber, RF link or acoustic channel. Any medium is possible for this system as long as it is amenable to the ASK/FSK digital transmission scheme incorporated into this invention.

This generic invention is further characterized by the use of at least one master modem 2 or a plurality of master modems, all of which are connected to controller-computers 3 and all of which conduct their digital transmissions with the same pair of frequencies $[v_i]$. It is important to note that all master/slave functions and roles are software-implemented (microcontroller) and that masters are only associated with computers herein because of the latters' greater sophistication vis-a-vis appliances, printers, thermostats, alarms or other devices, 6, less amenable to network command. Each modem sends and accepts data and address (information) and protocol to and from its microprocessor (controller) via any of the many possible parallel or serial standards available. Although there may be only one master of the $[v_i]$-network at one time, the use of multiple master modems/computer-controllers permits the LAN to achieve its maximum utility and flexibility (roving-master option). Accordingly, the network-master-function may be passed in a predetermined fashion among other possible controller-computers 3 on the LAN as a high-level command (protocol) similar to "token-passing" during the pre-programmed polling sequence which occurs among the modems 2. Consequently, when one master modem/controller-computer elects to transfer its network-master function, it becomes a slave modem/computer 5/6 with a network status equivalent to the other slaves 5 in the system subject to the (new) master modem/controller-computer 2 and 3 for purposes of prioritized polling, etc. Normal, permanent slave modems 5 are always connected to microcontroller-devices 6 and are never connected to computers—and hence are not convertible into master modems 2.

Practitioners of the generic embodiment of this invention as shown in FIG. 1A should be aware that because of the low noise and low error characteristics of the incorporated unequivocal ASK/FSK digital transmission scheme (see FIG. 3), it is possible to use other pairs of frequencies $[v_j]$ to establish a second (or plurality) autonomous system communicating on the same LAN consisting of the common bus 1 and its equivalent-medium branch links 4. In such an ultimate system, modems 2 and 5 would all be engaged in half-duplex intercommunication using a first set of frequencies $[v_i]$, and modems 7 and 9 would be using frequency set(s) $[v_j]$. In short, more than one master-and-slaves network can be accommodated on a single LAN. It must only be stipulated that the frequencies chosen, $[v_i]$, $[v_j]$, etc., must not cause mutual destructive interference in transmission. Of course, the relationship between computers(s) 8 to its master modem(s) 7 is the same as that delineated above for 2 and 3; the same is true of slave modem 9 and device 10 vis-a-vis 5 and 6 respectively. The devics, computers, and modems on the LAN may all be independently energized, or they may derive their basic power from a source connected to the principal bus 1 in some fashion.

In reference to FIG. 1B, a more limited, specialized version of the invention may be readily discerned. Herein does the LAN consist of electrical conductors 1A and 1B as the main communications bus and 4 as the network branch links. It is because of the metallic electrical character of the main bus in this LAN that this species embodiment of the invention is known as the Electrical System Transporter (EST), and it is intended to operate in either residential or commercial environments through the electrical distribution network of a building in which communications cabling is either undesirable or impractical. Therefore, the communication buses 1A and 1B are the electrical wiring system of a building(s) in which an LAN is to be established; 1A and 1B represent separate, multiple branches off a common electrical distribution system which differ from one another by a small phase angle $\Delta\phi$ with respect to the common 60 Hz, or other value of power transmission frequency, fed to the network at its common tiepoint at the house service distribution box 13 which is located at the (commercial AC) power cable entrance 12. It is assumed that, given the common gauges of wire used in houses and buildings today, the total maximum length of both conductors 1A and 1B are typically less than 4000 feet. This length is in anticipation of placing up to 256 modems 15 and 19 on the line, in an 8-bit address format, at anywhere from 2 to 8 ohms input impedance for each modem (unmatched) and of transmitting signals below FCC thresholds.

By way of example, the various slave modems 19 and their concomitant devices and appliances 20 should be freely placed around the house or building 11 which supports the LAN—interconnection into which is accomplished in the standard manner with normal electrical outlets and plugs 4. However, this EST embodiment of the invention also anticipates the use (and therefore the limitation) of a single permanent, electrically wired master modem 15 coupled to its controller-computer 16. These two units may be place at any suitable location within the building or house 11. This goes without saying for the slave modems 19 and their devices 20, which may be locally powered or energized through the conductors 1A and 1B in the standard manner. Of course, a basic master-and-slaves network within an LAN will conduct transmissions with a specific pair of frequencies $[v_i]$; but if it is desired to run additional systems on this same LAN with a different pair of frequencies $[v_j]$, then the corresponding master modem computer 17/18 would be added to form a different independent network as in FIG. 1A. At minimum, each controller in each modem is some 8-bit microprocessor means, such as the Intel 8035, 8048, 8051 or equivalent device.

Should a second system operating on a second set of frequencies $[v_j]$ be implemented on this LAN, it is understood that the corresponding slave modems 21 and their concomitant devices 22 are to be freely located through the rest of the building 11, connected into the LAN via standard electrical outlets and plugs 4. It is further expected that all modems 15 and 19, all computers 16 and 18, and all devices 20 and 22 to be used in this LAN are also to draw their operational (60 Hz or other) power from the house wiring 1A and 1B, but other arrangements may be utilized in this respect.

There is one further point concerning FIG. 1B. Because the various electrical branches in a building's distribution network have heretofore been characterized by (60 Hz or other AC) phase differences thereamong and because precise pairs of analog frequencies further characterize the transmission scheme of this invention, it is highly probable that AC-line phasing problems will arise in an LAN having multiple branches 1A and 1B for a master modem 15 connected to one wiring phase 1A seeking to communicate with a number of slave modems 19 which may be connected to a different wiring phase 1B via-a-vis the point of common connection 13 and the master 15. To minimize these potential phase distortion problems, an LC-interface circuit 14A consisting of capacitors and torroids wound on nonsaturable cores (or an equivalent analog means), may be fabricated to tie the various wiring phases together at points remote from the central branching point 13—yet, as close thereto as possible. The inductance, L, and capacitance, C, of this interface circuit 14A are to be chosen by conventional calculation methods in order to series-tune this crossover to a frequency equal to that of the higher frequency of the set $[v_i]$, which is the more attentuated frequency. This phase interface circuit 14A also serves to cancel signal reflections at the house service distribution box 13 and furthermore tends to mitigate the transmission of both frequencies into the commercial network 12. Similarly, a second network on the LAN using a different pair of frequencies $[v_j]$ would require the deployment of a second selectively tuned LC-interface 14B.

Although other arrangements are possible, for the purposes of constructing this EST at the lowest cost, it is recommended that 8-bit components be utilized. Furthermore, short messages are more conducive to low error rates in this less active yet noisy transmission medium. Thus, with a single network system utilizing $[v_i]$ it will be possible to have a maximum of 256 slaves 19 where each one has a unique 8-bit address ($2^8=256$). Each slave 19 will communicate with the master 15 in two-way (half-duplex) asynchronous transmission modes according to the protocols selected for the system. (See FIGS. 6 and 7 for sample protocol illustration and flowchart.)

FIG. 2 represents a typical modem which, depending upon the software programmed into the microprocessor and the device to which it is coupled, may function either as a master or a slave. The design characteristics which follow are intended to optimize the function of this modem within the PLC-type LAN embodiment of this invention known as EST.

Interconnection to either phase 1A or 1B of the LAN is accomplished via a standard wall plug and socket union 4. That electrical pair is truly the network data line used by all modems to exchange data; it is plugged directly into an integrated 60 Hz (or other) line drainage filter, or line interface circuit, 31 which permits 83 dB quieting. Any noise remaining on the line after this point exists principally in the form of transients or "spikes" and are dealt with in the various filter and discrimination sections of the receiver 32 and 33 respectively.

Essentially, the receiver section of every modem consists of three main parts: an amplitude regularizer and filter stage 32, a data-error elimination and ADC stage 33, and a serial-to-parallel (S/P) digital interface 34 which connects directly via circuit path 40 to the appropriate ports of an 8048-type microprocessor 38 or its equivalent amont controllers. The interface 34 is also paralleled with a binary integration circuit 39 on path 40 whereby a protocol-predetermined number of consecutive logical ones ("111 . . . 1") produces an "acknowledge" message for the microcontroller 38. (For further details, see FIGS. 4 and 7.)

Information (data or address) and protocol originating in the system computer 16 or one of the slave devices 20, via the controller 38, are sent out on the wired LAN via modem circuit path 41 to the modem transmitter which transforms the parallel digital data into serial ASK/FSK analog signals onto line 4. Modem transmitter sections are fundamentally the inverse of the receivers. They also contain three discrete stages: parallel-toserial (P/S) digital interface 35, a gating data release stage 36, and a DAC 37. (For further information, see FIGS. 5 and 8.)

FIG. 3 is a graphic representation of the dual-frequency transmission scheme which is at the very heart of this invention. The coding scheme is unequivocal because two separate events must take place in order for a "mark" or "space" to be generated. The best categorization for this coding scheme is hybird ASK/FSK since it gives an indication of the dual conditions which must obtain before digital data can be created. That duality of conditions is as follows.

Two frequencies must be chosen (below 500 kHz for FCC requirements) to represent individually a "one" (mark) and a "zero" (space). This is the first condition: $v_1$ is only turned on to indicate logical one and nothing else; $v_2$ in like manner only signifies the existence of logical zero. However, superimposed upon this first set of conditions is the further stipulation that either $v_1$ or $v_2$ can only be "on" within the e interval not to exceed one-half a digital bit period, which interval is therefore defined as a function of one cycle of each separate frequency at minimum.

Thus, unless both conditions occur, no valid data will be forthcoming for reception or transmission. It is this same duality of events which makes for the unequivocal geberatuib if data which is relatively error-free and virtually immune from the noise and interference which characterizes PLL carrier-sync methods.

The specific frequencies, to tones, must be selected so that they are sufficiently far apart in frequency to prevent spurious triggering and harmonic problems with the various filter and detection circuits in the receiver sections 32 and 33 of the modem. They may be as close together as filter discrimination permits, and a good indicium could be a frequency difference sufficient to produce a $-6$ dB signal from the "wrong" filter at "correct" signal input—hence, a convenient threshold level for a comparator reference signal.

Still referring to FIG. 3, it is the selection of the discrete frequencies which next has a direct bearing on the bit period, and hence, upon the data transmission rate. As mentioned before, the minimum burst from one oscillator is one cycle for a time $t_1$ (for a one) or $t_2$ (for a zero), which intervals are necessarily unequal since $v_1$ is somewhat higher than $v_2$. Therefore, a minimum tone burst will have two zero-crossings. Therefore, the digital data transmission rate must be selected and/or the frequency of the lower-tone oscillator must be chosen so that the bit period is temporarily two times as long as one cycle of $v_2$ (the lower frequency), or alternatively, the bit rate (baud) of the clocked data stream must be one-half $v_2$. For this exemplary EST embodiment, it is the inherent nature of the low cost components which limit the selected data rate to about 85 kbd. This necessarily mandates that $v_2$ cannot be less than 170 kHz and further that $v_1$ must always be somewhat higher than 170 kHz. Certainly however, speed upgrading is within the spirit of this invention.

It is the selection of this particular data-encoding and transmission scheme which enables such superb low errors in data content without the cnventional need for inordinate numbers of error-detect bits demanding excessive headroom in protocol, and hence, byte complexity. Similarly, faster-than-normal baud transmission is permitted thereby as compared with other PLC systems.

The key to success in working with the ASK/FSK data transmission scheme is found in the receiver sections of the modem as best disclosed in FIG. 4, for it is here that the special XOR-gate network is located to detect and correct data errors.

But first, the incoming analog tone bursts must be converted into digital data; hence, the first section of the receiver is known as the ADC. It consists of a bipolar hard limiter 50 which itself incudes an operational amplifier and a dual-diode network. It operates in the absence of any automatic gain control within a range of 5 millivolts to 10 volts (66 dB dynamic range). It is this stage which kills most of the spikes and flash thus rendering well formed tone bursts $v_1$ and $v_2$ into the subsequent filter stage. Here the circuit path diverges into two sets of filters 51 and 52; the former being tuned to pass and double-integrate only $v_1$; the latter, set up for $v_2$ only. The bipolar waveforms then each separately proceed into the fast-attack/slow-release sample-and-hold detecting (S/H) circuits 53 and 54 respectively for $v_1$ and $v_2$. The ADC stage ends where the outputs of these S/H circuits outpulse into respective comparator amps 56 and 57 as referenced by an amplitude standard 55A whose output is always high enough, as an out-of-band false-trigger guard, to keep both comparators 56 and 57 "normally off." However, positive output from either 53 or 54 will disable the referent source 55A. This can be accomplished through a gating action of the active 6 dB pad circuits 55B and 55C which can be constructed in any well known manner so as to cross-connect the attenuated outputs of 53 to 57 and of 54 to 56 respectively while simultaneously rendering amplifier 55A inactive. Thus, comparators 56 and 57 are never "on" at the same time, and only discriminated unipolar digital output results from the detection of either a "1" or a "0."

So far, data has been detected and rendered into digital form solely on the basis of the discrimination between the two frequencies $v_1$ and $v_2$. This is only the first step in dual-stage unequivocal data reception.

The next stage in FIG. 4 to which data proceeds involves a split path—one leading to the binary integration circuit 39 (and subsequently to the exemplary 8048-type controller) and the other leading to the critical digital-error-detection circuit 60 which is built around an XOR-gate 58 and four timing mechanisms 61, 62, 63, and 64 which are orchestrated to detect the existence of digital pulses (formerly, tones) during the interval of one-half a normal bit period. Essentially, the presence of any data in the form of either a "one" or "zero" will trigger the XOR gate 58 which, in turn, will activate the first timer 61 and enable the time constants of all three clocking devices 61, 62 and 64 and of the dual one-shot clock-resetter 63 as well. The first timer 61 triggers the second timer 62 which pulses the then provides clocking to the S/P converters 34. This whole process is initialized by the transmission of a "start bit" logical one at the beginning of every word of data. Subsequent data pulses will either synchronize with the output of the second timer 62, or else data will fall to pass the OR gate 59 into the S/P interface 34 since the resetter 63 is calibrated to respond to an error within 1.5 bit periods by firing a reset pulse which will clear the S/P data buffer 34. Absent error, data passes freely, and this is the termination of the second stage necessary to complete unequivocal data reception with consistency and predictability.

Data, actually protocol signals, leaving the OR-gate 59 in the form "111 . . . 1" (all logical ones) may be diverted to a parallel circuit path impinging on the binary integration circuit 39, which may be designed in any of a number of conventional manners to be enabled or reset directly by the microcontroller 38. The purpose of this subcircuit is to provide the intelligent receiving circuits of the microprocessor 38 with knowledge that a previously transmitted message has been received by a distant modem; it is an "acknowledgment," or word-receipt, signal. (See FIGS. 6 and 8 for further clarification.)

Data/address messages may be sequentially loaded into the S/P converter 34 which comprises shift registers 66, 67, and 68 during error-free conditions within the receiver. The S/P shift registers (typically 74164's or 74198's) are configured to load information sequentially and immediately prior to the generation of a "data-ready" signal ("start bit") in register 68, after which, the registers' are data-latched until reset by the controller 38. The third timer, which may be collocated on a single chip with the other two timers (e.g., 558-type timer device), is set up to reset the S/H detecting circuits 53 and 54 and to clamp the data inputs (+) of the comparators 56 and 57 to the "off" state during at least one-half of the data bit period.

The end result is a parallel shifting-out of data to the 8048-type microprocessor 38, which could be associated with either a slave device or a master computer. Data can be read through a single 8-bit port since the shift registers 66, 67, and 68 are triggered separately and sequentially.

In reference to FIG. 5, it is plain to see that the transmitter of a typical modem is a comparatively straightforward configuration vis-a-vis the corresponding receiver circuits. Formal transmission into the LAN initializes when data/address is loaded into the P/S digital interface 35, which consists of three shift registers 81, 82, and 83 (typically 74165's or 74198's), and when, simultaneously, both clocks 84 are directly enabled by the modem's 8048-type controller 38. These clocks 84 may be an autonomous 556-type device (2 timers per chip), or they may be part of the multi-timer (558-type) device referred to in the receiver circuitry of FIG. 4. They function to activate the three shift registers 81, 82, and 83 as well as the discriminator AND-gates 85 and 86. Serial data corresponding to logical ones is output on the appropriate pin, $Q_H$, of register 83 to the input of AND-gate 85; the obverse is true for logical zeros and AND-gate 86. Two oscillators 87 and 88 running at $v_1$ and $v_2$ respectively may be of the continuous-operation variety or the fast-attack variety (8038-type devices or dual TL074's). In any event, they are selectively quick-switched through the dual-SPST switching device 89 (typically a DG 200-type device) depending upon the appropriate outputs of gates 85 and 86. This switched output is sufficiently amplified by the gain device 90 to produce the desired signal level directed onto the AC line of the LAN via the liner interface circuit 31.

It is significant to indicate at this point of summation with respect to FIGS. 4, and 5 and 6 that the word length of 12 bits chosen for the basic EST is completely arbitrary and selected with an eye towards cost reduction. Clearly, a maximum information field using all the components enumerated to this point could be 23 bits and one "start bit," which in FIG. 4 is launched from the most significant active data pin of buffer 68. In FIG. 5, the start-bit pin is in buffer 83. However, by changing protocols, address lengths, and data content, the information bit length, and hence overall word length, may be easily changed, and all that would be "hardware necessary" involves only the translocation of the start bit to the first live pin of the lowest-numbered register in the respective sets 66,67, and 68 and 81,82, and 83.

FIG. 6 provides a symbolic chart for the mnemonic structure of the simple, low-level 3-bit protocol required to run a simple yet satisfactory LAN in terms of the design requirements of the EST. A typical message, or word, structure is also depicted—based on the 8-bit model for either data or address. Other combinations are possible given different control field requirements and/or circuit components, and at least one such alternative is displayed wherein a higher-level 4-bit protocol (nos. 9 through 12) could be used with the EST to achieve the roving-master feature mentioned in reference to FIG. 1A. Naturally, this would tax these illustrated shift registers to their full capacity, and 24-bit bytes would easily result.

FIG. 7 illustrates a typical interconnection between an 8048-type microcontroller 38 and the digital interfaces 34 and 35 associated with the transmit/receive subcircuits of EST-type modems or other contemplated embodiments within the spirit of this invention. Also depicted is the interface between the exemplary 8048-type microprocessor 38 and both the binary integration circuit 39 of the modem's receiver and the clocks 84 employed in the modem's transmitter. As one skilled in the relevant arts can readily see, only one of the two quasi-bidirectional data ports 100 (8048 design assumed) is required for interconnection both to the transmit and receive buffers 81, 82, and 83 and 66, 67, and 68 respectively. For consistency with the previous illustrations, hardware utilization (pin assignment) is configured for handling 12-bit words, including one receive-start bit launched from register 68 to an appropriate pin on the microprocessor 38, such as "interrupt." Similarly, the data-ready/start bit pin at the transmitter buffer 83 can be connected to a suitable output port pin on the microprocessor, such as "write"; it should be apparent that this particular initializing command is closely related to the transmit-latching of the registers 81,82, and 83. Hence, the transmit-start pin of register 83 may be connected directly to (sequential or parallel fashion) latch-/enable pins ("serial input" or "shift load" as found in typical 74165's) of the individual buffers 81,82, and 83. Of course, other configurations are possible in accordance with flexibility of circuit design wherein these particular chip components, or their equivalents, are utilized.

For the transmission of data to the LAN, FIG. 7 makes it clear that at the processor-proximate digital stage, the data line-out originates at shift register 83 and terminates at the AND-gates 85 and 86. The transmitter clocks 84 are directly enabled by the controller microprocessor 38 at its appropriate output port pin, i.e., "address latch enable."

As regards the reception of data from the LAN, FIG. 7 shows that the binary integration circuit 39 should be integrally related to the buffers 66,67, and 68 insofar as the microprocessor 38 pin "read" (or output port equivalent) must create a positive output to both disable the binary integration circuit 39 and enable the S/P buffers 66,67, and 68 and vice-versa. The data-in line originates at the OR-gate 59 and terminates both in the first shift register 66 and the binary integration circuit 39, wherein the detection of a "111 . . . 1" in this latter element 39 creates a positive "acknowledge" signal hard-wired directly to the microprocessor 38 at a suitable interrupt-style pin termination such as "single step."

Of course, the output/input between the 8048-type microprocessor 38 and the various independent devices 20 or computer(s) 16 may be accomplished in a dozen common ways via an appropriate communication bus 101 which may be fully bidirectional or simplex depending upon the explicit applications contemplated. Each modem on the LAN may even have completely different interfaces at this point.

FIGS. 8A and 8B are intended to give one skilled in arts a simple "big picture" of the function-by-function as well as the priority of operations available for a (12-bit byte) minimally designed, yet versatile EST. The inventors hope that the inclusion of this algorithmic flowchart will spare the reader the experience of traversing ulterior troublesome text. However, it should be minimally understood that the network master sequentially polls each slave for data according to FIG. 8A. The start-bit message from the master begins the whole operation. Finally, it should be recognized that a master modem will retry polling attempts to an unresponsive slave modem only for a predetermined number of times; after that number, an error signal or alarm is reported to the master's network controller. Slaves never retry but instead will save their data until their proper addresses are received in the course of the polling sequence.

Naturally, with data buffers incorporated into each modem, long polling cycles are possible, especially in response to the needs of an expanded (256-plus modems) LAN.

We claim:

1. A private data network including some localized transmission medium, at least one master modem, at least one slave modem, and means for encoding, transmitting and receiving signals among said modems according to a data encoding and transmission scheme whereby a first analog frequency is selected to represent logical one by being both transmitted and received by a modem for a period of time equivalent to no more than one-half the bit period of said logical one and whereby a second analog frequency is selected to represent logical zero by being transmitted and received by a modem for a period of time equivalent to no more than half the bit period of said logical zero for the purpose of exchanging data throughout the area served by said localized transmission medium.

2. The private data network of claim 1 wherein said localized transmission medium comprises a set of electrical conductors and wherein said means for encoding, transmitting and receiving signals provides for noise immunity and data error-rate reduction in digital data transmission and receiption among said modems.

3. The private data network of claim 1 wherein said localized transmission medium includes a set of fiber optical links.

4. The private data network of claim 1 wherein said localized transmission medium includes an RF signal path, or channel.

5. The private data network of claim 1 wherein said localized transmission medium includes an acoustic signal path, or channel.

6. A private data network consisting essentially of a localized transmission medium, at least one master modem connected to a network-controlling computer, a plurality of slave modems separately and individually connected to different electronic devices or terminals related to said computer, and means for encoding, transmitting and receiving signals among said modems according to a data encoding and transmission scheme whereby a first analog frequency is selected to represent logical one by being both transmitted and received by a modem for a period of time equivalent to no more than one-half the bit period of said logical one and whereby a second analog frequency is selected to represent logical zero by being both transmitted and received by a modem for a period of time equivalent to no more than one-half the bit period of said logical zero for the purpose of exchanging information and control signals throughout the area served by said localized transmission medium.

7. The private data network of claim 6 wherein said transmission medium comprises an electrical power line and wherein said means for encoding, transmitting and receiving signals optimizes both power-line noise immunity and data error-rate reduction.

8. The private data network of claim 7 wherein said electrical power line used for the transmission medium consists essentially of the electrical distribution system of a single building or a small number of proximately located buildings having a plurality of transmission line branches and a phase-matching circuit means for minimizing phase distortion in the signals transmitted among the branches of said electrical distribution system.

9. The private data network of claim 8 wherein said data and control signals are exchanged among said modems in bidirectional modes.

10. The private data network of claim 9 wherein said data encoding and transmission scheme includes the use of a given pair of distinct frequencies, or tones, the lowest of which in $H_z$ is at least twice the value of the data transmission rate in baud.

11. An expandable private data network according to claim 8 wherein a second autonomous master modem and its associaed slave modems severally connected to electronic devices or terminals are added to said data network via the utilization of a first pair of frequencies, or tones, for the first master modem and its associated slave modems according to said data encoding and transmission scheme and a corresponding second pair of frequencies, or tones, for the second master modem and its associated slave modems according to the same data encoding and transmission scheme.

12. The private data network of claim 10 wherein data and control signals are exchanged among the modems at rates in the neighborhood of 85 kbaud.

13. A modem capable of functioning either as a master or a slave in the private data network according to claim 10 and which is composed of electrical and electronic elements, including:

(a) a power-line interface circuit,
 (b) a microprocessor means,
 (c) an analog-to-digital data receiving means,
 (d) a digital-to-analog data transmitting means,
 (e) an internal asynchronous timing means,
 (f) a serial-to-parallel means for interfacing said data receiving means to said microprocessor means, and
 (g) a parallel-to-serial means for interfacing said data transmitting means to said microprocessor means, wherein said modem is connected directly between the electrical distribution system and an appropriate computer, electronic device or terminal.

14. The modem of claim 13 wherein said analog-to-digital data receiving means includes an asynchronously clocked XOR-gating subcircuit for detecting and blocking digital data errors caused by power-line transients, and wherein said digital-to-analog data transmitting means includes a means for deriving two separate frequencies, or tones, consistent with the data encoding and transmission scheme.

15. The modem of claim 14 wherein said serial-to-parallel and parallel-to-serial interfacing means are separate banks of data-shifting registers, or buffers, which are bit-compatible with said microprocessor means and which are asynchronously clocked at rates in the neighborhood of 85 kbaud.

16. The private data network of claim 10, wherein data and control signals are exchanged among the modems at baud rates limited to one-half the frequency in Hz of the lower of the two frequencies used in the encoding and transmission scheme.

* * * * *